(12) United States Patent
Sung et al.

(10) Patent No.: US 10,805,831 B1
(45) Date of Patent: Oct. 13, 2020

(54) CONTROL OF COORDINATED-MULTIPOINT SERVICE IN A VIRTUAL RADIO ACCESS NETWORK

(71) Applicant: Sprint Spectrum L.P., Overland Park, KS (US)

(72) Inventors: Sanghoon Sung, Ashburn, VA (US); Yu Wang, Fairfax, VA (US); Yun Sung Kim, Ashburn, VA (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 401 days.

(21) Appl. No.: 15/493,570

(22) Filed: Apr. 21, 2017

(51) Int. Cl.
*H04W 28/02* (2009.01)
*H04W 72/12* (2009.01)
*H04B 7/024* (2017.01)

(52) U.S. Cl.
CPC ........ *H04W 28/0289* (2013.01); *H04B 7/024* (2013.01); *H04W 72/1252* (2013.01)

(58) Field of Classification Search
CPC .......... H04W 28/0289; H04W 72/1252; H04B 7/024
See application file for complete search history.

(56) References Cited

U.S. PATENT DOCUMENTS

| | | | |
|---|---|---|---|
| 8,798,021 B2 | 8/2014 | Mangalvedhe et al. | |
| 9,413,435 B1 | 8/2016 | Oroskar et al. | |
| 2012/0004009 A1* | 1/2012 | Lindoff | H04W 52/0232 |
| | | | 455/522 |
| 2012/0184322 A1 | 7/2012 | Falconetti et al. | |
| 2013/0017852 A1 | 1/2013 | Liu et al. | |
| 2013/0258890 A1 | 10/2013 | Li et al. | |
| 2015/0282035 A1* | 10/2015 | Xia | H04W 36/08 |
| | | | 455/436 |
| 2016/0080278 A1* | 3/2016 | Wu | H04L 47/28 |
| | | | 370/235 |
| 2016/0242147 A1* | 8/2016 | Tarlazzi | H04W 72/042 |
| 2017/0005736 A1* | 1/2017 | Gage | H04B 7/024 |
| 2018/0310328 A1* | 10/2018 | Lin | H04L 5/0035 |

FOREIGN PATENT DOCUMENTS

WO   WO2014/062104   4/2014

* cited by examiner

*Primary Examiner* — Christopher M Crutchfield
*Assistant Examiner* — Tito Q Pham (57) ABSTRACT

A method and system to help control CoMP service in a V-RAN arrangement. The load on a cell site's fronthaul network interface between the cell site's RRH and the cell site's BBU is determined. And in response to detecting that the fronthaul load is threshold high, a limit will be imposed on application of CoMP service involving the cell site. For example, in response to detecting that the cell site's fronthaul network interface is threshold highly loaded, (i) the cell site could be made to use decentralized joint processing rather than centralized joint processing, (ii) a lower coverage strength threshold could be imposed as a basis to trigger CoMP service involving the cell site, and/or (iii) the quantity of uplink communication that is subject to CoMP service involving the cell site could be limited.

20 Claims, 5 Drawing Sheets

CONTROL OF COORDINATED-MULTIPOINT SERVICE IN A VIRTUAL RADIO ACCESS NETWORK

BACKGROUND

A typical radio access network (RAN) includes a plurality of cell sites, each configured to provide one or more respective wireless coverage areas in which to serve user equipment devices (UE) such as cell phones or wirelessly equipped computers. In practice, situated at each cell site would be a respective antenna configuration as well as supporting cell site equipment, including a remote radio head (RRH) and a baseband unit (BBU), coupled with network infrastructure such as routers, switches, gateways, other base stations, etc. For instance, a typical cell site could include a tower, with the antenna configuration and the RRH mounted at the top and the BBU located at the base, and with the BBU and RRH coupled together by a multi-fiber cable or the like.

With such an arrangement, the BBU may interface with the RRH, and the RRH may interface with the antenna configuration. Thus, the BBH could generate or receive from the network infrastructure a downlink communication to be transmitted to a UE, the BBU could transmit the communication to the RRH, and the RRH could then transmit the communication to the antenna configuration for over-the-air transmission in a coverage area. And the antenna configuration could receive an uplink communication in the coverage area, which could flow to the RRH, the RRH could transmit the communication to the BBU, and the BBU could process the communication or transmit it in turn to the network infrastructure, as appropriate.

By way of example, when the BBU has control or bearer data to transmit over the air to a UE (whether the data is received from the network infrastructure or generated by the BBU), the BBU could programmatically encode the data by applying constellation coding or the like to produce complex symbols (e.g., I and Q samples) that represent the data, and the BBU could transmit within the cell site to the RRH a data representation of those complex symbols. And in turn, the RRH could then modulate the symbols onto an RF carrier and transmit the modulated RF carrier to the antenna configuration for downlink air interface transmission.

Likewise, when the antenna configuration receives a modulated RF carrier transmitted over the air in a coverage area of the cell site, the modulated carrier could pass to the RRH, the RRH could demodulate the carrier to determine the underlying symbols, and the RRH could transmit within the cell site to the BBU an associated data representation of those symbols. And in turn, the BBU could then decode the symbols to uncover the underlying data, which the BBU could then process or transmit to the network infrastructure, as appropriate.

Further, a cell site's BBU could also apply scheduling logic to control when such uplink and downlink communication would occur, based on various factors. For instance, for downlink communication, the BBU could schedule air interface transmission to occur in a particular time interval and could accordingly provide the data to the RRH for air interface transmission in that time interval. And for uplink communication, the BBU could generate and provide downlink transmission of a scheduling directive that causes a UE to engage in uplink transmission in a particular time interval.

In practice, a BBU could take the form of a cabinet containing a shelf unit that holds one or more channel cards, such as one channel card for each carrier frequency on which the cell site is configured to operate, with each channel card including logic modules (e.g., circuitry and/or one or more programmed processing units) to cause the BBU to carry out various operations such as encoding/decoding, scheduling, communication with an RRH, and so forth.

With rapid growth in wireless communication traffic, however, wireless service providers may need to deploy cell sites more densely, with smaller sizes and in locations where it may not be convenient or cost effective to provide such as BBU at each cell site.

One approach to address this problem is to implement what is known as a cloud-RAN (C-RAN), where the BBU function of a cell site is provided remote from the cell site and connected with the cell-site's RRH through a fronthaul network connection, such as a packet-switched network or other direct or indirect link. For instance, an example C-RAN could include a shared pool of BBUs for serving multiple cell sites, with a fronthaul network connection respectively between the BBU-pool and each cell site.

Given the need to transmit the data representation of symbols quickly between the BBU and RRH of a cell site, however, the C-RAN solution may require a high capacity fronthaul network connection between the BBU and the RRH. But such high-capacity network connections may not be available or cost-effective in many regions.

Given this, another possible approach is to implement a variation of the C-RAN known as a virtual-RAN (V-RAN). A V-RAN effectively splits the BBU functionality of a cell site in two, with some functions being provided by a cloud-based BBU and other functions being provided at the cell site by an RRH. For instance, the cloud-BBU could still carry out functions such as scheduling and the like, but the RRH could be tasked with carrying out the lower-layer processing of data such as encoding data into symbols for RF modulation and air interface transmission, and decoding RF modulated complex symbols into data for handling by the cloud-BBU.

Theoretically with the V-RAN arrangement, it could be unnecessary to communicate the data representation of symbols between the BBU and the RRH, since the BBU and RRH would exchange the underlying data instead. In particular, when the BBU generates or receives data to transmit over the air to a UE, the BBU could transmit that data to the RRH, and the RRH could then apply constellation coding or the like to establish symbols and then modulate the symbols onto an RF carrier for air interface transmission. And when the RRH receives uplink transmission of a modulated RF carrier, the RRH could uncover the symbols from that carrier and decode the symbols into the underlying data, and the RRH could transmit the underlying data to the BBU for handling.

Because the underlying data would be less substantial than a data representation of the complex symbols (e.g., I and Q samples) to be used for RF modulation, the fronthaul network interface between the BBU and the RRH in a V-RAN arrangement could theoretically be much lower capacity than the communication link between the BBU and the RRH in a C-RAN arrangement.

OVERVIEW

Unfortunately, however, a V-RAN could still face an issue with the capacity of a BBU-RRH fronthaul network interface. In particular, an issue could arise if the V-RAN supports coordinated multipoint (CoMP) service between cell sites.

CoMP service involves a cluster of cell sites working cooperatively to improve communication with a UE, with one cell site functioning as a master cell site and one or more neighboring cell sites functioning as supporting cell sites. CoMP could be particularly helpful on the uplink, but could also apply in the downlink direction.

In a representative uplink implementation of CoMP, a cell site with which a UE is attached could function as the master site, and one or more neighboring sites could each function as a supporting site. When the master cell site schedules uplink air interface transmission from the UE to occur on particular air interface resources, such as particular subcarriers at a particular time interval, the master cell site could then also signal to each supporting site to indicate the scheduled air interface resources, and each supporting cell site could then operate to help receive the UE's communication on those resources.

In particular, when a UE engages in the scheduled uplink transmission, (i) the master cell site could receive the transmission, and (ii) each supporting site could also receive the transmission and transmit a representation of the received transmission to the master cell site to assist the master cell site in processing. The master cell site could then combine together these multiple copies of the UE's transmission, or could select the best of the received copies, to help bolster the quality of the uplink communication.

In this CoMP process, the representation of the received uplink transmission that the supporting cell site transmits to the master cell site could take various forms. In a "centralized joint processing" CoMP scheme, for instance, the supporting cell site could transmit to the master cell site a representation of the symbols (e.g., I and Q samples) that the supporting cell site demodulates from the RF carrier, without decoding those symbols into the underlying data. Whereas, in a "decentralized joint processing" CoMP scheme, the supporting cell site could decode the symbols so as to uncover the underlying data and could transmit to the master cell site the underlying data.

In a V-RAN arrangement where a cell site's RRH is tasked with the encoding/decoding function (converting between complex symbols and the underlying data), CoMP carried out with centralized joint processing would involve transmission of the data representation of symbols from the RRH of a supporting cell site to the RRH of a master cell site. The RRH of the master cell site could then make use of the received symbol data to possibly improve the RRH's decoding of the UE's uplink transmission so as to uncover the underlying data for transmission to the BBU of the master cell site. But this means that the substantial data representing the symbols would need to be transmitted over the fronthaul network interface of both cell sites, namely (i) from the RRH to the BBU of the supporting cell site, and (ii) from the BBU to the RRH of the master cell site.

On the other hand, CoMP carried out with decentralized joint processing could avoid or reduce this added load on the fronthaul network interface of each cell site. In particular, the RRH of the supporting cell site could decode the symbols of the UE's uplink transmission to uncover the underlying data and could send that data via its fronthaul network interface to the BBU of the supporting cell site, which could then send the data to the BBU of the master cell site. And the BBU of the master cell site could then send the data via its fronthaul network interface to the RRH of the master cell site, which could then use the data to bolster what it received itself from the UE.

In practice, centralized joint processing may be more robust and helpful than decentralized joint processing in terms of bolstering a UE's uplink communication. However, it follows from the discussion above that, in a V-RAN arrangement, centralized joint processing could also load each cell site's fronthaul network interface more than decentralized joint processing. Consequently, when a cell site's fronthaul network interface is heavily loaded, it could help if CoMP service involving that cell site (whether the cell site operates as a master cell site or as a supporting cell site) would use decentralized joint processing rather than centralized joint processing.

Further, the quantity of data that the cell sites exchange with each other could also depend on the quantity of air interface resources that are subject to the CoMP process. With more air interface resources subject to the process, there could be more symbols and thus more data exchanged between the cell sites. Whereas, with fewer air interface resources subject to the process, there could be fewer symbols, and thus less data exchanged between the cell sites. Given this, when a cell site's fronthaul network interface is heavily loaded, it could help if CoMP service involving that cell site would be limited in terms of the quantity of air interface resources subject to the CoMP service.

Accordingly, disclosed herein is a method and system to help control CoMP service in a V-RAN arrangement. In accordance with the disclosure, the load on a cell site's fronthaul network interface between the cell site's RRH and the cell site's BBU will be determined. And in response to detecting that the load is threshold high, a limit will be imposed on application of CoMP service involving the cell site. By way of example, in response to detecting that the cell site's fronthaul network interface is threshold highly loaded, (i) the cell site could be made to use decentralized joint processing rather than centralized joint processing, (ii) a lower coverage strength threshold could be imposed as a basis to trigger CoMP service, and/or (iii) the quantity of uplink communication that is subject to CoMP service involving the cell site could be limited.

In this manner, load on the cell site's fronthaul network interface could be managed, such as to help avoid or minimize the likelihood that CoMP service involving the cell site would avoid overburdening the cell site's fronthaul network interface.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only and that numerous variations are possible.

DETAILED DESCRIPTION

Referring to the drawings, as noted above, FIG. 1 is a simplified block of an example wireless communication system including two representative cell sites 12, 14. These cell sites 12, 14 are shown as being base station antenna towers with respective supporting cell site equipment shown as a box labeled "BS". In practice, though, a cell site does not need to have an antenna tower but could take some other form. For instance, the antenna configuration of a cell site could be mounted on a building or other structure, or the cell site could be provided in a smaller, integrated form as a small-cell, femtocell, or the like. Other examples are possible as well.

Figure 1:
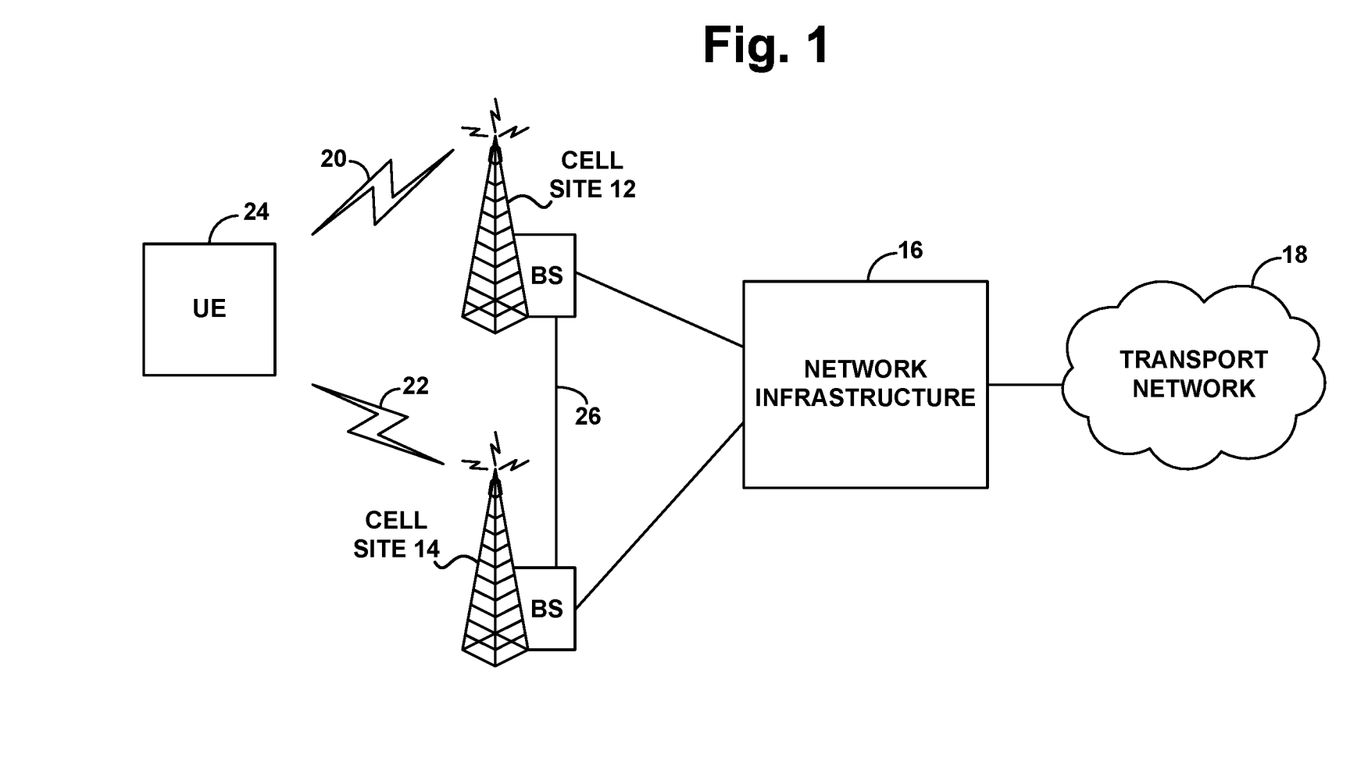
FIG. 1 is a simplified block diagram or an example wireless communication system.

As further shown, both example cell sites 12, 14 are coupled with network infrastructure 16 (e.g., including routers, gateways, switches, servers, etc.), which may provide connectivity with a transport network 18, such as the Internet for instance. In addition, each cell site is configured to provide a respective wireless coverage area, such as a cell or sector, in which to serve UEs. In particular, cell site 12 is shown providing a representative wireless coverage areas 20, and cell site 14 is shown providing a representative wireless coverage area 22. Further, these two coverage areas are shown both extending to a location of a representative UE 24. For instance, the cell sites could be configured to provide partially overlapping coverage, and UE 24 could be currently positioned in the area of overlap of the coverage areas.

In practice, these cell sites may be arranged to provide wireless communication service in accordance with a defined air interface protocol, examples of which include, without limitation, Long Term Evolution (LTE) (using Orthogonal Frequency Division Multiple Access (OFDMA) on the downlink and Single Carrier Frequency Division Multiple Access (SC-FDMA) on the uplink), Code Division Multiple Access (CDMA), Global System for Mobile Communication (GSM), or various wireless local area network protocols, such as IEEE 802.11 (WiFi), BLUETOOTH, or the like. The UEs operating in coverage of such a cell site may then be configured to communicate according to the same air interface protocol.

Each coverage area in such a system could be configured to operate on one or more carrier frequencies, or carriers. Such a carrier could be frequency division duplex (FDD), providing separate frequency ranges for downlink and uplink communication, or time division duplex (TDD), providing a common frequency range multiplexed over time between downlink and uplink communication.

Further, in accordance with the air interface protocol, the coverage area could be structured to define air interface resources that could be used to carry communications between the cell site and UEs.

For instance, an LTE coverage area is divided over time into a continuum of 1-millisecond transmission time intervals (TTIs), and each TTI is divided over time and frequency into an array of resource elements that can be modulated to carry air interface communications. In particular, each TTI is divided into 66.7-microsecond symbol time segments and each symbol time segment is divided over the carrier bandwidth into 15 kHz subcarriers. As a result, in each TTI, the LTE coverage area defines an array of resource elements each occupying a 15 kHz subcarrier and spanning 66.7 microseconds, and each resource element can be modulated to carry a symbol that represents underlying data being communicated. In addition, in each TTI, the resource elements are divided into 12-subcarrier wide groupings called physical resource blocks (PRBs), which the base station can schedule as needed to carry communications.

In the arrangement of FIG. 1, we can assume that UE 24 is served by cell site 12. For instance, the UE may have an established radio-link-layer connection with the base station of cell site 12 and may be attached with the network.

With this arrangement, when UE 24 has data to communicate on transport network 18, the UE may send a scheduling-request control over the air to the base station of cell site 12 seeking an allocation of uplink air interface resources on which to engage in the transmission. And the base station of cell site 12 may then select a range of PRBs in coverage area 20 to allocate for the uplink transmission and send a scheduling directive accordingly to the UE, and the UE may engage in the uplink transmission on the allocated air interface resources. Upon receipt of this uplink transmission, the base station of cell site 12 may then forward the underlying data to network infrastructure 16 for transmission onto transport network 18.

In addition, FIG. 1 shows cell site 12 being connected by an inter-cell-site interface 26 with cell site 14. For instance, under LTE, this could be an X2 interface between the base station of cell site 12 and the base station of cell site 14. This interface could be used for exchange of various information between the base stations, including handover related signaling, load information exchange, and bearer data. Further, the interface could be used for CoMP signaling between the cell sites.

In practice, the base station of cell site 12 could decide for various reasons to trigger use of uplink CoMP service for UE 24. For instance, the base station could detect that the UE is in relatively poor coverage of cell site 12, based on reports from the UE and/or evaluation of uplink communications from the UE, and the base station could responsively decide to trigger CoMP service for the UE.

As a specific example, for instance, the UE could regularly monitor strength of coverage from the base station (e.g., reference signal receive power, or the like) and could be configured to transmit to the base station a measurement report when the coverage strength is weaker than a threshold level, such as a threshold designated in advance by the base station. Further, the base station could be configured to respond to receipt from the UE of a measurement report indicating that the UE is experiencing coverage weaker than the threshold by invoking CoMP service for the UE. Other examples are possible as well.

For this CoMP service, the base station of cell site 12 could operate as a master base station, and the base station of cell site 14 could operate as a supporting base station. These base stations could be clustered for this purpose in advance, so that the base station of cell site 12 would know to use the base station of cell site 14 as a supporting base station for CoMP service. Alternatively, the base station of cell site 12 could select the base station cell site 14 for this purpose based on receiving a report from UE 24 indicating that UE 24 is within sufficiently strong coverage of the base station of cell site 14.

In line with the discussion above, the base station of cell site 12 could thus implement CoMP service for the UE. For instance, when the base station of cell site 12 is scheduling uplink transmission by the UE on particular PRBs (defined as being within a particular TTI and being a particular range of PRBs in frequency), the base station of cell site 12 could transmit via the inter-cell-site interface 26 to the base station of cell site 14 a CoMP service request specifying the scheduled PRBs. And the base station of cell site 14 could thus operate to receive the UE's uplink transmission on the indicated PRBs and to transmit via the inter-cell-site interface a data representation of that uplink transmission, to help bolster the uplink communication at cell site 12.

In this CoMP process, as discussed above, the base station of cell site 12 could direct use of centralized joint processing, in which case the base station of cell site 14 would transmit to the base station of cell site 12 a data representation of the complex symbols that were modulated on RF carrier. Or the base station of cell site 12 could direct use of decentralized joint processing, in which case the base station of cell site 14 would transmit to the base station of cell site 12 the underlying data, resulting from decoding the complex symbols. In either case, the base station of cell site 12 could make use of the data provided by base station of cell site 12 in an effort to help improve the quality of the received uplink communication.

Figure 2:
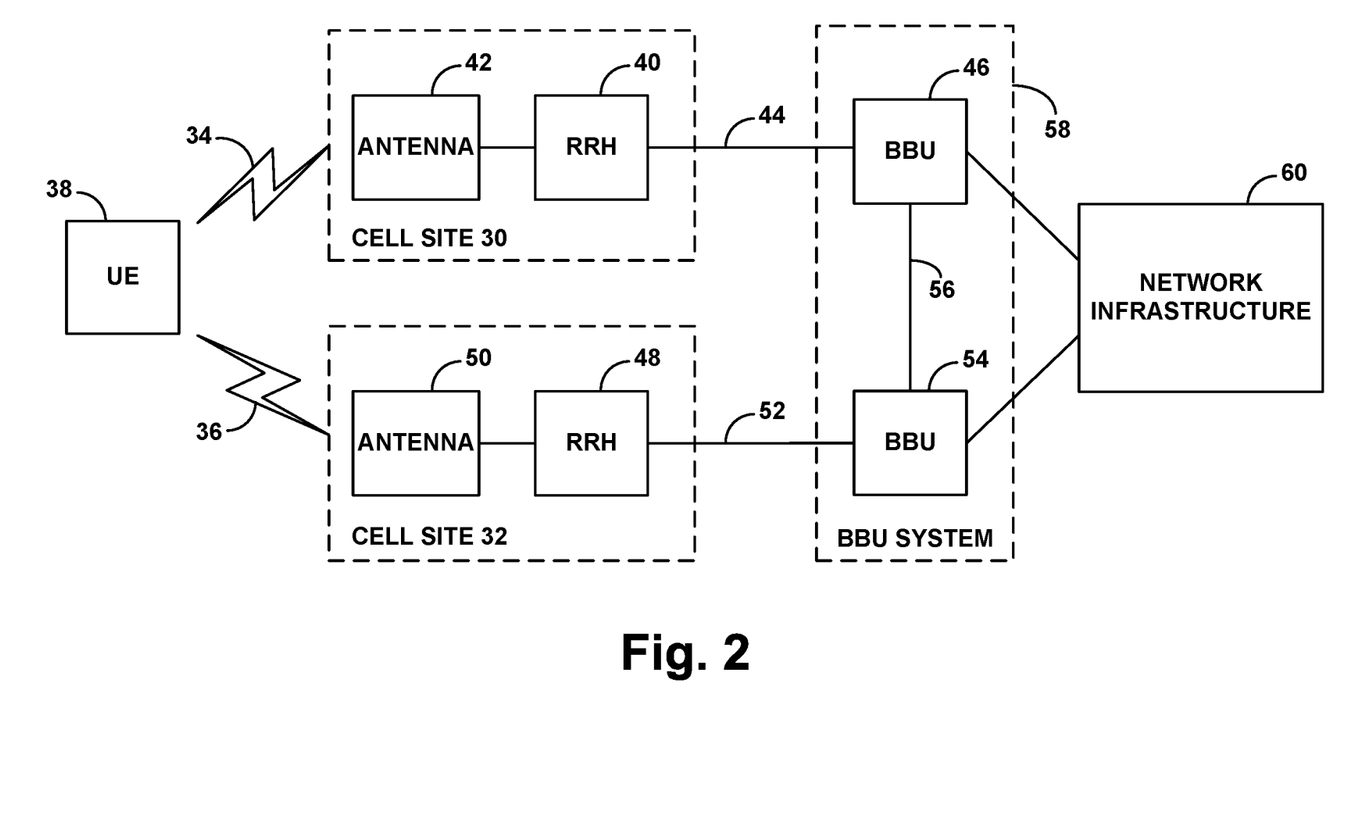
FIG. 2 is a simplified block diagram of an example V-RAN arrangement.

FIG. 2 is next a depiction of an example V-RAN arrangement in which features of the present disclosure can be implemented. In particular, FIG. 2 depicts two cell sites 30, 32, providing respective wireless coverage areas 34, 36 where a representative UE 38 is located. Each cell site is then shown including a representative RRH and antenna configuration and being coupled via a fronthaul network interface with a cloud-BBU. In particular, cell site 30 is shown including RRH 40 and antenna configuration 42 and being coupled by fronthaul interface 44 with cloud-BBU 46, and cell site 32 is shown including RRH 48 and antenna configuration 50 and being coupled by fronthaul interface 52 with cloud-BBU 54. Further, the cloud-BBUs could be a common BBU that serves the two cell sites, or they could be separate BBUs in a pool of BBUs or could take other forms. In any case, the figure shows the cloud-BBUs as being logically or physically coupled together by an interface 56, such as an X2 interface for instance cooperatively as part of a BBU system 58. And the figure also shows the BBUs being coupled with network infrastructure 60 similar to the arrangement discussed above.

With an arrangement such as this, the cloud-BBU system could schedule air interface transmission and reception by each cell site's RRH and could communicate with each cell site's RRH via the cell site's fronthaul network interface. For instance, as to a given cell site, the BBU system could transmit scheduling directives and downlink data via the fronthaul interface to RRH, to facilitate scheduling and transmission of downlink air interface communication, and the BBU system could receive uplink data via the fronthaul interface from the RRH. Further, each cell site's RRH could be configured to (i) receive the downlink data transmitted via the fronthaul interface from the BBU system to the RRH, encode the downlink data to produce downlink symbols, and modulate the downlink symbols to provide downlink air interface transmission, and (ii) receive uplink air interface transmission, demodulate the uplink transmission to uncover uplink symbols, decode the uplink symbols to uncover the uplink data, and transmit the uplink data via the fronthaul interface to the BBU system.

The fronthaul interface between each cell site's RRH and the cell site's associated BBU could take various forms, including one or more direct or indirect links, which could be wired and/or wireless links and packet-switched and/or circuit-switched. By way of example, connectivity between the cell site RRHs and the BBU system could be provided by a packet-switched network, with the RRHs and BBUs having Internet Protocol addresses on the network. Other examples are possible as well.

In this V-RAN arrangement, we could assume that cell site 30 is serving UE 38. Thus, at some point, BBU 46 could receive from UE 38 a scheduling request seeking allocation of uplink air interface resources for carrying communication from UE 38, and BBU 46 could coordinate the uplink communication accordingly.

For instance, in response to the UE's scheduling request, BBU 46 could select a range of PRBs to allocate in a given TTI for the UE and a constellation coding scheme to use for the transmission. BBU 46 could then transmit a scheduling directive accordingly to the UE, via RRH 40, and notify RRH 40 of the planned uplink transmission and coding scheme. When UE 38 then engages in the uplink transmission, RRH 40 could then receive the UE's transmission via antenna configuration 42, demodulate the carrier to uncover the symbols in the resource elements of the allocated PRBs, and decode the symbols to uncover the underlying data. And the RRH could transmit the underlying data via fronthaul interface 44 to BBU 46 for appropriate handling.

Further, we could assume that at some point, BBU 46 also decides to apply uplink CoMP service for the UE. For instance, BBU 46 could make this decision on one of the bases noted above.

In applying CoMP service in this arrangement, when BBU 46 has decided to allocate particular uplink PRBs for use by the UE, BBU 46 could also send a CoMP service request via interface 56 to BBU 54, requesting cell site 32 to function as a supporting cell site for the CoMP service. In line with the discussion above, the request here could be to implement centralized joint processing, distributed joint processing, or other forms of CoMP for that matter. Further, the request could specify PRBs that would be the subject of the CoMP service, which could be the range of PRBs that BBU 46 has decided to allocate to the UE or perhaps a subset of those PRBs.

With centralized joint processing, BBU 54 could then signal via fronthaul interface 52 to RRH 48 of cell site 32 to direct RRH 48 to receive and demodulate transmission on the indicated PRBs. In response, RRH 48 could thus receive the UE's uplink transmission on those PRBs via antenna configuration 50 and demodulate the carrier to uncover the symbols carried by the resource elements, and RRH 48 could transmit data representing those symbols via fronthaul interface 52 to BBU 54. And BBU 54 could pass that data to BBU 46, which could transmit the data via fronthaul interface 44 to RRH 40. Meanwhile, RRH 40 would have also received and demodulated the UEs uplink transmission via antenna configuration 42. Thus, RRH 40 could advantageously combine together the symbols received via antenna configurations 42 and 50 to help best decode the UE's uplink communication. And RRH 40 could then pass the underlying data via fronthaul interface 44 to BBU 46 for handling.

Whereas, with decentralized joint processing, BBU 54 could signal via fronthaul interface 52 to RRH 48 of cell site 32 to cause RRH 48 to receive, demodulate, and decode the communication on the indicated PRBs. Thus, RRH 48 could do so accordingly and could transmit the underlying data via fronthaul interface 54 to BBU 54, BBU 54 could pass the data to BBU 46, and BBU 46 could transmit the data via fronthaul interface 44 to RRH 40 of cell site 30 for use in combination with the uplink data uncovered by RRH 40. Alternatively, BBU 46 itself could simply make use of the data uncovered by RRH 48, in combination with the underlying data uncovered by RRH 40.

In line with the discussion above, one or more entities in this arrangement could monitor the load on fronthaul interface 44 and the load on fronthaul interface 52, and could use those load metrics as a basis to limit CoMP service involving cell site 30 or cell site 32.

In practice, this load monitoring could be conducted by the BBUs serving the respective cell sites, and could be done over a sliding window. For instance, at issue here could be how much data flows over a given fronthaul interface per unit time. Thus, a BBU could monitor the data flow per unit time and determine an average on a sliding window basis. Other load metrics could be considered and other load-monitoring processes could be used as well.

In addition, the cell sites' BBUs could exchange their fronthaul network interface load information with each other. For instance BBU 46 could periodically transmit via interface 56 to BBU 54 an indication of the load on fronthaul interface 44, and BBU 54 could periodically transmit via interface 56 to BBU 46 an indication of the load on fronthaul interface 52.

The data that flows over the fronthaul interface could include user-plane and control-plane signaling of various sorts, such as bearer data being communicated between the network infrastructure and one or more UEs, control signaling flowing between the BBU and one or more UEs, and control signaling between the BBU and RRH to facilitate V-RAN operation. Further, among these or other examples, the data could include CoMP signaling such as data representing UE communications being exchanged between cell sites.

As discussed above, when a cell site's fronthaul interface load is at least threshold high, a BBU could responsively decide to limit CoMP service involving that cell site.

For instance, if BBU 46 is considering applying CoMP service for UE 38 and using cell site 32 as a supporting cell site for the CoMP service, BBU 46 could consider the load on its own fronthaul interface 44 and the load on the fronthaul interface 52 of cell site 32. If the load on neither of those fronthaul interfaces is threshold high (considering a defined threshold level of load deemed by engineering design to be threshold high) or perhaps threshold low (considering a similar low level threshold), then BBU 46 could by default invoke CoMP service with centralized joint processing.

Whereas, if load on either or both of those fronthaul interfaces is threshold high, then BBU 46 could respond to that situation by limiting CoMP service in some manner. For instance, the BBU 46 could responsively invoke CoMP service with decentralized joint processing rather than invoking CoMP service with centralized joint processing. Alternatively or additionally, BBU 46 could responsively reduce the coverage strength threshold for triggering a UE measurement report that would trigger CoMP service. For example, the BBU could cause either or both cell sites to broadcast a revised system information message that specifies a reduced coverage strength threshold, to cause UEs that monitor coverage strength to apply the reduced coverage strength threshold.

Still alternatively or additionally, the BBU could responsively limit the quantity of PRBs that it subjects to the CoMP service, such as by directing application of CoMP service only as to a portion of the PRBs actually allocated for use by the UE. And yet alternatively or additionally, if load on fronthaul interface 44 is not threshold high, but load on fronthaul interface 52 is threshold high, BBU 46 could decide to not use cell site 32 for the CoMP service and might consider if there is another cell site that could function as a supporting cell site instead.

Figure 3:
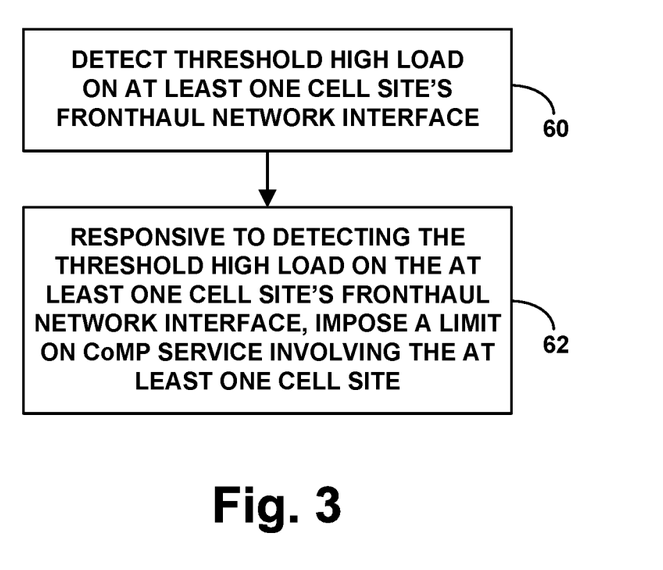
FIG. 3 is a flow chart depicting operations that could be carried out in accordance with the present disclosure.

FIG. 3 is next a flow chart depicting operations that could be carried out in accordance with this disclosure, to control CoMP service in a V-RAN comprising a plurality of cell sites and a centralized (e.g., cloud-based) BBU system, where each cell site has at least one respective RRH and is interconnected by a respective fronthaul network interface with the BBU system. As shown in FIG. 3, at block 60, the operations include detecting threshold high load on at least one cell site's fronthaul network interface. And at block 62, the operations include, responsive to detecting the threshold high load on the at least one cell site's fronthaul network interface, the BBU system imposing a limit on CoMP service involving the at least one cell site.

In line with the discussion above, the CoMP service in this process could be triggered in a given instance by receipt of a UE report of wireless coverage weaker than a threshold, and the act of imposing the limit on the CoMP service involving the at least one cell site could involve reducing the threshold so as to reduce a likelihood of triggering the CoMP service.

Further, the act of imposing the limit on the CoMP service involving the at least one cell site could take various forms as discussed above. For instance, it could involve causing the at least one cell site to use decentralized joint processing CoMP mode rather than centralized joint processing CoMP mode, such as by directing use of decentralized joint processing accordingly. Further, the CoMP service involving the at least one cell site could involve either of that cell site and a neighboring cell site transmitting to the other of the cell site and the neighboring cell site a representation of received uplink communication, in which case the act of imposing the limit on the CoMP service could involve limiting a quantity of the uplink communication as to which the representation is transmitted.

Figure 4:
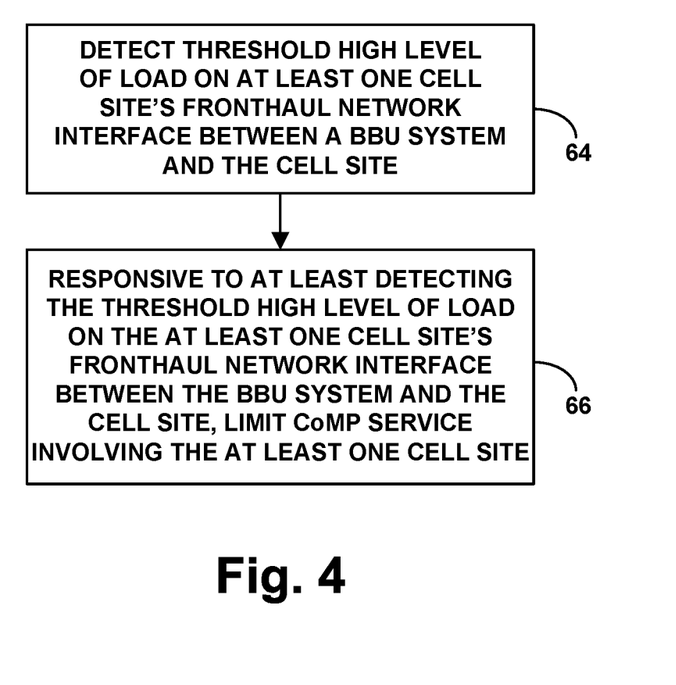
FIG. 4 is another flow chart depicting operations that could be carried out in accordance with the present disclosure.

FIG. 4 is next another flow chart depicting operations that can be carried out in accordance with this disclosure, to control CoMP service in a V-RAN comprising a plurality of cell sites and a centralized BBU system, where each cell site has at least one respective RRH and is interconnected by a respective fronthaul network interface with the BBU system.

In line with the discussion above, such a system could be arranged such that, for each cell site, the BBU system schedules air interface transmission and reception by the cell site's RRH and, via the cell site's fronthaul network interface, (i) transmits corresponding scheduling directives to the cell site's RRH, (ii) transmits downlink data to the cell site's RRH, and (iii) receives uplink data from the cell site's RRH. Further, each cell site's RRH could be configured to (i) receive the downlink data transmitted from the BBU system to the RRH, encode the downlink data to produce downlink symbols, and modulate the downlink symbols to provide downlink air interface transmission, and (ii) receive uplink air interface transmission, demodulate the uplink transmission to uncover uplink symbols, decode the uplink symbols to uncover the uplink data, and transmit the uplink data to the BBU system.

In such an arrangement, as shown in FIG. 4, at block 64, the operations include the BBU system detecting a threshold high level of load on at least one cell site's fronthaul network interface between the BBU system and the cell site. And at block 66, the operations include, responsive to at least detecting the threshold high level of load on the at least one cell site's fronthaul network interface between the BBU system and the cell site, limiting CoMP service involving the at least one cell site.

Features discussed above can be applied in this context as well. For example, the act of detecting the threshold high level of load on the at least one cell site's fronthaul network interface between the BBU system and the cell site could involve monitoring (e.g., on a sliding window basis) how much data flows over the cell site's fronthaul network interface between the BBU system and the cell site and determining based on the monitoring that at least a predefined threshold high quantity of data flows over the cell site's fronthaul network interface between the BBU system and the cell site.

Further, the CoMP service involving the cell site could involve (i) the cell site and a neighboring cell site each receiving uplink air interface communication and (ii) either of the cell site and the neighboring cell site transmitting to the other of the cell site and the neighboring cell site a representation of the received uplink air interface communication. In that case, the CoMP service could be triggered in a given instance by a UE reporting radio frequency coverage weaker than a threshold, and the act of limiting CoMP service could involve reducing the threshold, so as to reduce a likelihood of triggering the CoMP service.

Alternatively or additionally, the act of limiting the CoMP service could involve limiting a size of the representation of the uplink air interface communication. For instance, the CoMP service could have various different modes, including centralized joint processing mode and decentralized joint processing mode, in which case the act of limiting the CoMP service involving the cell site could involve causing the cell site to use the decentralized joint processing mode rather than the centralized joint processing mode. (By way of example, a default mode of operation could be centralized joint processing mode, and a decision could be made in this situation to instead use the decentralized joint processing mode.)

Or the act of limiting CoMP service could involve limiting a quantity of the uplink air interface communication as to which the representation is transmitted. For instance, in a scenario where the air interface communication encompasses a plurality of physical resource blocks, and the act of limiting the quantity of the uplink air interface communication as to which the representation is transmitted could involve limiting the number of the physical resource blocks as to which the representation is transmitted.

Figure 5:
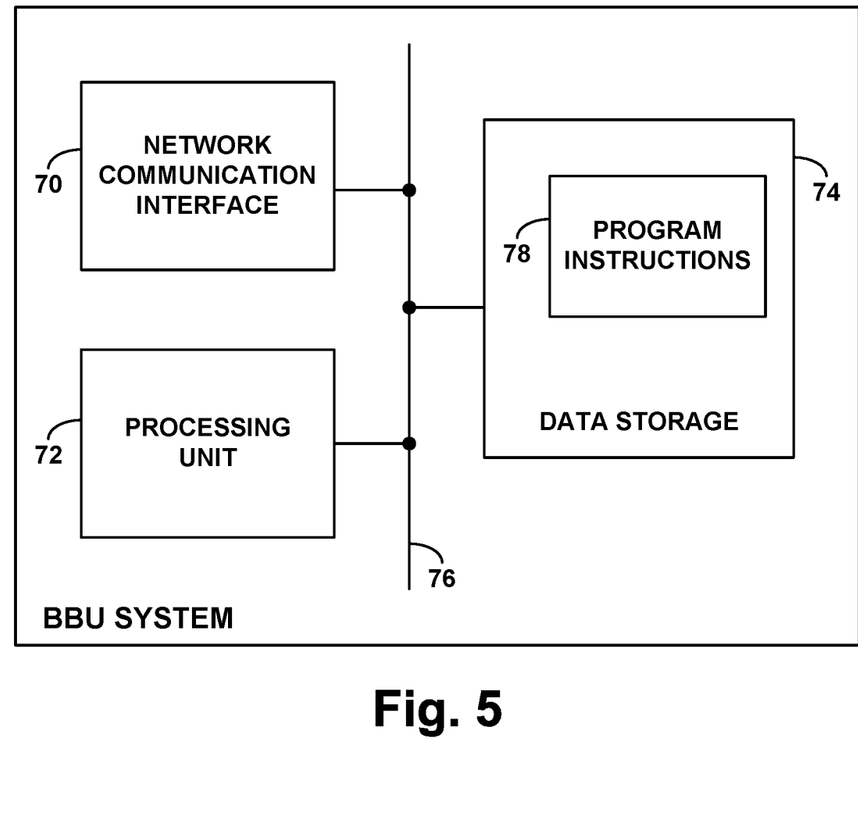
FIG. 5 is a simplified block diagram depicting components that could be included in an example BBU system, such as in one or more BBUs within a V-RAN.

Finally, FIG. 5 is a simplified block diagram showing some of the components that could be include in a BBU system (e.g., one or more BBUs) configured to control CoMP service, where the BBU system is interconnected in a virtual radio access network (V-RAN) arrangement with a plurality of cell sites via a fronthaul network interface respectively between the BBU system and each cell site. As shown in FIG. 5, the BBU system includes a network communication interface 70, a processing unit 72, and non-transitory data storage 74, all of which could be integrated, coupled together or communicatively linked by a system bus, network, or other connection mechanism 76.

Network communication interface 70 could comprise one or more Ethernet network interface modules or other types of physical interfaces for connecting with one or more networks so as to facilitate fronthaul communication with each cell site and perhaps to facilitate backhaul communication with network infrastructure. Processing unit 72 could then comprise one or more microprocessors or other processors. And data storage 74 could comprise one or more volatile and/or non-volatile storage components, such as magnetic, optical, or flash storage. As shown, data storage 74 then holds program instructions 78, which could be executable by processing unit 72 to carry out various BBU operations described herein.

Features described above could then be applied in this context, and vice versa. For example, for each cell site, the BBU system could be configured to schedule air interface transmission and reception by the cell site's RRH and, via the cell site's fronthaul network interface, to (i) transmit corresponding scheduling directives to the cell site's RRH, (ii) transmit downlink data to the cell site's RRH, and (iii) receive uplink data from the cell site's RRH. And each cell site's RRH could be configured to (i) receive the downlink data transmitted from the BBU system to the RRH, encode the downlink data to produce downlink symbols, and modulate the downlink symbols to provide downlink air interface transmission, and (ii) receive uplink air interface transmission, demodulate the uplink transmission to uncover uplink symbols, decode the uplink symbols to uncover the uplink data, and transmit the uplink data to the BBU system.

As discussed above, such a BBU system could be configured to control the CoMP service by detecting a threshold high level of load on at least one cell site's fronthaul network interface between the BBU system and the cell site and, responsive to at least the detecting, limiting CoMP service involving the at least one cell site. For instance, the BBU system could carry out various operations as described above in connection with FIG. 4.

Exemplary embodiments have been described above. Those skilled in the art will understand, however, that changes and modifications may be made to these embodiments without departing from the true scope and spirit of the invention. For example, although the discussion above focuses on uplink CoMP service, the disclosed principles could extend to apply with respect to downlink CoMP service.

We claim:

1. A method for controlling coordinated-multipoint (CoMP) service in a virtual radio access network (V-RAN) comprising a plurality of cell sites and a centralized baseband unit (BBU) system, wherein a first cell site of the plurality of cell sites provides a first coverage area and has a first remote radio head (RRH) interconnected by a first fronthaul network interface between the first RRH and the BBU system, and wherein a second cell site of the plurality of cell sites provides a second coverage area and has a second RRH interconnected by a respective second fronthaul network interface between the second RRH and the BBU system, the method comprising:

monitoring load on the first fronthaul network interface; and using the monitored load on the first fronthaul network interface as a basis to control whether the CoMP service operates in a centralized joint processing mode or rather in a decentralized joint processing mode, wherein using the monitored load as a basis to control whether the CoMP service operates in the centralized joint processing mode or rather in the decentralized joint processing mode includes (i) detecting that the monitored load on the first fronthaul network interface is threshold high and (ii) responsive to at least detecting that the monitored load on the first fronthaul network interface is threshold high, causing the CoMP service to operate in the decentralized joint processing mode rather than in the centralized joint processing mode, wherein the CoMP service comprises transmitting over the first fronthaul network interface from the first RRH to the BBU system and in turn from the BBU system over the second fronthaul network interface to the second RRH, a representation of an uplink communication received by the first RRH from the first coverage area, wherein the first RRH receives the uplink communication from the first coverage area as complex symbols representing underlying data, wherein, in the centralized joint processing mode, the first RRH transmits to the BBU system, and the BBU system transmits in turn to the second RRH, a representation of the complex symbols, rather than the first RRH decoding the complex symbols to uncover the underlying data and transmitting to the BBU system, for transmission in turn from the BBU system to the second RRH, the underlying data, and wherein, in the decentralized joint processing mode, the first RRH decodes the complex symbols to uncover the underlying data and transmits to the BBU system, for transmission in turn from the BBU system to the second RRH, the underlying data, rather than the first RRH transmitting to the BBU system, for transmission in turn from the BBU system to the second RRH, the representation of the complex symbols.

2. The method of claim 1, wherein the CoMP service is triggered in a given instance by receipt of a user equipment device (UE) report of coverage weaker than a threshold level, the method further comprising:

responsive to at least detecting that the monitored load on the first fronthaul network interface is threshold high, reducing the threshold level so as to reduce a likelihood of triggering the CoMP service.

3. The method of claim 1, wherein the monitoring of load on the first fronthaul network interface comprises monitoring how much data flows over the first fronthaul network interface, and where the detecting that the monitored load on the first fronthaul network interface is threshold high comprises determining, based on the monitoring of how much data flows over the first fronthaul network interface between the BBU system and the first RRH, that at least a predefined threshold high quantity of data flows over the first fronthaul network interface.

4. The method of claim 3, wherein the monitoring of how much data flows over the first fronthaul network interface is done over a sliding window.

5. The method of claim 1, wherein the complex symbols comprise I and Q samples.

6. The method of claim 1, wherein the complex symbols represent the underlying data through constellation coding.

7. The method of claim 1, wherein the method is implemented by the BBU system.

8. The method of claim 1, wherein the causing of the CoMP service to operate in the decentralized joint processing mode rather than in the centralized joint processing mode is additionally responsive to determining that load on the second fronthaul network interface is threshold high.

9. The method claim 1, wherein causing the CoMP service to operate in the decentralized joint processing mode comprises signaling from the BBU system to the first RRH to direct the first RRH to decode the received communication.

10. A method for controlling coordinated-multipoint (CoMP) service in a virtual radio access network (V-RAN) comprising a plurality of cell sites and a centralized baseband unit (BBU) system, wherein a first cell site of the plurality of cell sites provides a first coverage area and has a first remote radio head (RRH) interconnected by a first fronthaul network interface between the first RRH and the BBU system, and wherein a second cell site of the plurality of cell sites provides a second coverage area and has a second RRH interconnected by a respective second fronthaul network interface between the second RRH and the BBU system, the method comprising:

monitoring load on the first fronthaul network interface; and using the monitored load on the first fronthaul network interface as a basis to control whether the CoMP service operates in a centralized joint processing mode or rather in a decentralized joint processing mode, wherein using the monitored load as a basis to control whether the CoMP service operates in the centralized joint processing mode or rather in the decentralized joint processing mode includes (i) detecting that the monitored load on the first fronthaul network interface is threshold high and (ii) responsive to at least detecting that the monitored load on the first fronthaul network interface is threshold high, causing the CoMP service to operate in the decentralized joint processing mode rather than in the centralized joint processing mode, wherein the CoMP service comprises transmitting from the first RRH of the first cell site to the second RRH of the second cell site a representation of uplink communication received by the first RRH from the first coverage area, and wherein the first RRH receives the uplink communication from the first coverage area as complex symbols representing underlying data, wherein, in the centralized joint processing mode, the representation of the uplink communication that is transmitted from the first RRH of the first cell site to the second RRH of the second cell site is a representation of the complex symbols rather than being the underlying data, and wherein, in the decentralized joint processing mode, the representation of the uplink communication that is transmitted from the first RRH of the first cell site to the second RRH of the second cell site is the underlying data rather than being a representation of the complex symbols.

11. The method of claim 10, wherein the monitoring of load on the first fronthaul network interface comprises monitoring how much data flows over the first fronthaul network interface, and where the detecting that the monitored load on the first fronthaul network interface is threshold high comprises determining, based on the monitoring of how much data flows over the first fronthaul network interface between the BBU system and the first RRH, that at least a predefined threshold high quantity of data flows over the first fronthaul network interface.

12. The method of claim 10, wherein the complex symbols comprise I and Q samples.

13. The method of claim 10, wherein the complex symbols represent the underlying data through constellation coding.

14. The method of claim 10, wherein the method is implemented by the BBU system.

15. The method of claim 10, wherein the causing of the CoMP service to operate in the decentralized joint processing mode rather than in the centralized joint processing mode is additionally responsive to determining that load on the second fronthaul network interface is threshold high.

16. A baseband unit (BBU) system configured to control coordinated-multipoint (CoMP) service virtual radio access network (V-RAN) comprising a plurality of cell sites and the BBU system, wherein a first cell site of the plurality of cell sites provides a first coverage area and has a first remote radio head (RRH) interconnected by a first fronthaul network interface between the first RRH and the BBU system, and wherein a second cell site of the plurality of cell sites provides a second coverage area and has a second RRH interconnected by a respective second fronthaul network interface between the second RRH and the BBU system, the BBU system comprising:

a network communication interface;
a processing unit;
data storage; and
program instructions stored in the data storage and executable by the processing unit to cause the BBU system to carry out operations comprising:
 monitoring load on the first fronthaul network interface, and
 using the monitored load on the first fronthaul network interface as a basis to control whether the CoMP service operates in a centralized joint processing mode or rather in a decentralized joint processing mode, wherein using the monitored load as a basis to control whether the CoMP service operates in the centralized joint processing mode or rather in the decentralized joint processing mode includes (i) detecting that the monitored load on the first fronthaul network interface is threshold high and (ii) responsive to at least detecting that the monitored load on the first fronthaul network interface is threshold high, causing the CoMP service to operate in the decentralized joint processing mode rather than in the centralized joint processing mode,
 wherein the CoMP service comprises transmitting over the first fronthaul network interface from the first RRH to the BBU system and in turn from the BBU system over the second fronthaul network interface to the second RRH, a representation of an uplink communication received by the first RRH from the first coverage area, wherein the first RRH receives the uplink communication from the first coverage area as complex symbols representing underlying data,
 wherein, in the centralized joint processing mode, the first RRH transmits to the BBU system, and the BBU system transmits in turn to the second RRH, a representation of the complex symbols, rather than the first RRH decoding the complex symbols to uncover the underlying data and transmitting to the BBU system, for transmission in turn from the BBU system to the second RRH, the underlying data, and
 wherein, in the decentralized joint processing mode, the first RRH decodes the complex symbols to uncover the underlying data and transmits to the BBU system, for transmission in turn from the BBU system to the second RRH, the underlying data, rather than the first RRH transmitting to the BBU system, for transmission in turn from the BBU system to the second RRH, the representation of the complex symbols.

17. The BBU system of claim 16, wherein the monitoring of load on the first fronthaul network interface comprises monitoring how much data flows over the first fronthaul network interface, and where the detecting that the monitored load on the first fronthaul network interface is threshold high comprises determining, based on the monitoring of how much data flows over the first fronthaul network interface between the BBU system and the first RRH, that at least a predefined threshold high quantity of data flows over the first fronthaul network interface.

18. The BBU system of claim 16, wherein the complex symbols comprise I and Q samples, and wherein the complex symbols represent the underlying data through constellation coding.

19. The BBU system of claim 16, wherein the causing of the CoMP service to operate in the decentralized joint processing mode rather than in the centralized joint processing mode is additionally responsive to determining that load on the second fronthaul network interface is threshold high.

20. The BBU system of claim 16, wherein causing the CoMP service to operate in the decentralized joint processing mode comprises signaling from the BBU system to the first RRH to direct the first RRH to decode the received communication.

* * * * *